United States Patent Office 2,894,316
Patented July 14, 1959

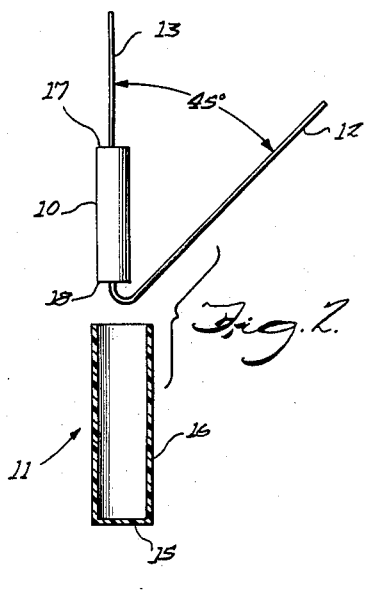
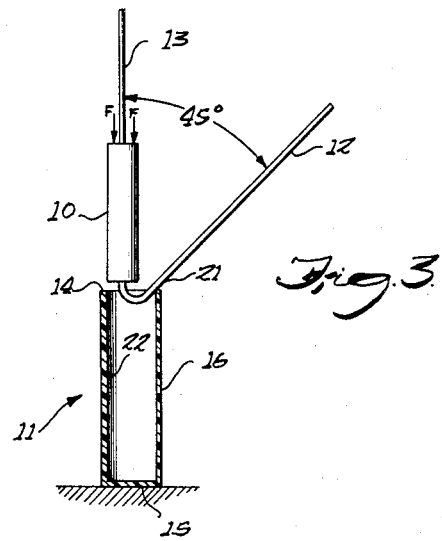
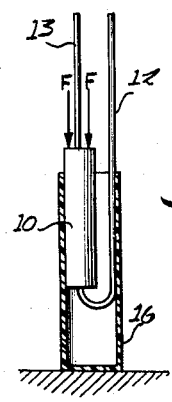
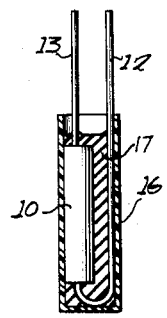
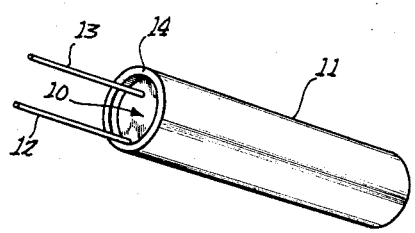

2,894,316

METHOD OF SPACING CAPACITOR LEADS

Anthony N. Genovese, Chicago, Ill., assignor to Chicago Condenser Corporation, Chicago, Ill., a corporation of Illinois Application January 21, 1955, Serial No. 483,228

2 Claims. (Cl. 29—25.42)

This invention relates to methods of manufacturing capacitors, and more particularly to methods of manufacturing capacitors in which the terminals of the capacitor project from the same side of the capacitor casing.

It is an object of this invention to provide an improved method of manufacturing capacitors having terminals well insulated and spaced from one another in the same general physical location for easy access from a single direction so that the capacitors are particularly useful with automatic production equipment for manufacturing electronic equipment.

Another object of this invention is to provide an improved high production process for the manufacture of capacitors.

Other objects and advantages of the invention will become apparent during the course of the following description when read in connection with the accompanying drawing, wherein:

Figure 1 is a perspective view of the capacitor of the type manufactured by this invention;

Figure 2 shows a capacitor body, with its soldering terminals attached, in position above a casing and illustrates one step in the manufacturing process;

Figure 3 illustrates a further step in the manufacturing process and shows the capacitor body of Figure 2 lowered to contact the open end of the casing just prior to being inserted into the casing;

Figure 4 illustrates a still later stage of the manufacturing process and shows the capacitor body of Figures 2 and 3 inserted approximately halfway into the casing; and Figure 5 shows the completed capacitor with the capacitor body of Figures 2 through 4 inserted fully into its casing and firmly held therein by a sealant.

Referring now more particularly to Figure 1, there is shown a capacitor body 10 sealed into a cylindrical casing 11. The two terminals 12 and 13 are shown to project from one end 14 of the casing 11. Referring now to Figure 2, it is seen that the casing 11 has its other end 15 closed by a plate which may be an integral part of the side walls 16 of the casing 11. The capacitor body 10 may consist of alternate sections of conductive sheeting and insulating paper and have soldered to it at one end a terminal 13 which is centered on the body end 17. The terminal 12 is soldered to the other end 18 of the capacitor body 10 and projects outward at an angle of 45° to the longitudinal axis through the capacitor body 10. The manner in which the terminals 12 and 13 connect alternate conductive sheeting of the capacitor body is well known in the art and will not be further described here.

The capacitor body 10 and its terminals are assembled into the casing 11 by first bending one of the wire terminals 12 relative to the axis of the body and lowering the body and terminals until the terminal 12 makes contact with the edge 21 of the casing end 14, as shown in Figure 3. The capacitor body 10 is now parallel to the casing 11, with one section of its perimeter nearly aligned with one section of the inner surface 22 of the casing side wall 16. In the next step, the capacitor 10 is forced downward into the casing 11. This may be accomplished by applying a force F to the top of the capacitor body 10, either manually or by means of a mechanical device. As this is done, the terminal 12 is bent further toward the body 10, exerting at all times a force against the casing side wall 16 which firmly positions the capacitor body 10 against a section of the inner side wall 22 of the casing 11. An intermediate position of the capacitor body 10 as it is forced into its casing is shown in Figure 4.

Referring now to Figure 5, the capacitor body 10 is shown fully inserted into its casing 11. A sealant 17, which may be a quick-setting resin or a high temperature wax or the like, is poured to permeate the ends of the capacitor body 10 and fill the casing 11 to cover the capacitor body and firmly hold the terminals 12 and 13 in spaced relationship. As can be seen from Figure 5, the terminals 12 and 13 are readily accessible from one direction since they project from the same end of the casing 11. Further, they are spaced so that the terminal 12 is positioned adjoining the inner surface 22 of the casing 11, while the terminal 13 is positioned between the center of the casing end 14 through which it projects and the casing side wall 16 opposite to the portion of the casing side wall which contacts the terminal 12. Thus, an insulating space is provided between the two terminals 12 and 13.

While there has been shown and described an invention in connection with certain specific embodiments, it will, of course, be understood that the inventor does not intend nor wish to be limited thereto since it is apparent that the principles herein disclosed are susceptible of numerous other applications. Also, modifications may be made in the structural arrangement and in the instrumentalities employed without departing from the spirit and scope of this invention as set forth in the appended claims.

I claim as my invention:

1. The method of producing a capacitor assembly having a cylindrical casing closed at one end and a cylindrical capacitor body of smaller diameter than the casing enclosed therein comprising the steps of providing an elongated cylindrical capacitor body having first and second wire terminals extending outwardly from opposite ends thereof in line with the longitudinal axis of the body, said second terminal extending from the body along the axis thereof and having a bend with a permanent set greater than 90 degrees and less than 180 degrees, inserting said capacitor body into said casing with the second terminal leading the capacitor body and against the resistive force of said second terminal bearing against the inside of said casing, whereby the second terminal abuts one side of the casing and spring biases the body against the opposite side of the casing, and permeating the space between the casing, capacitor body and terminals with a sealant.

2. The method of producing a capacitor assembly having a cylindrical casing closed at one end and a cylindrical capacitor body of smaller diameter than the casing enclosed therein comprising the steps of providing an elongated cylindrical capacitor body having first and second wire terminals attached to opposite ends of the body, the first terminal extending outwardly from one end of the body in line with the longitudinal axis of the body and said second terminal extending from the opposite end of the body with a permanent set along an axis at an acute angle to the first terminal, inserting said capacitor body into said casing with the second terminal leading the capacitor body and against the resistive force of said second terminal bearing against the inside of said casing, whereby the second terminal abuts one side of the casing and spring biases the body against the opposite side of the casing, and permeating the space between the casing, capacitor body, and terminals with a sealant.

References Cited in the file of this patent

UNITED STATES PATENTS

| | | |
|---|---|---|
| 839,928 | Hill | Jan. 1, 1907 |
| 1,856,392 | Kevelson | May 3, 1932 |
| 2,181,695 | Given | Nov. 28, 1939 |
| 2,538,977 | Mucher | Jan. 23, 1951 |
| 2,563,196 | Spry | Aug. 7, 1951 |
| 2,627,538 | Brennan | Feb. 3, 1953 |
| 2,698,372 | Pata | Dec. 28, 1954 |
| 2,704,880 | Brennan | Mar. 29, 1955 |
| 2,773,708 | Brennan | Sept. 18, 1956 |

FOREIGN PATENTS

| | | |
|---|---|---|
| 334,074 | Italy | Jan. 21, 1936 |
| 838,632 | Germany | May 12, 1952 |